(12) United States Patent
Govil

(10) Patent No.: US 8,466,858 B2
(45) Date of Patent: Jun. 18, 2013

(54) SENSING TO DETERMINE PIXEL STATE IN A PASSIVELY ADDRESSED DISPLAY ARRAY

(75) Inventor: Alok Govil, Santa Clara, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 899 days.

(21) Appl. No.: 12/365,089

(22) Filed: Feb. 3, 2009

(65) Prior Publication Data

US 2009/0201242 A1    Aug. 13, 2009

Related U.S. Application Data

(60) Provisional application No. 61/027,792, filed on Feb. 11, 2008.

(51) Int. Cl.
*G09G 3/34* (2006.01)
*G09G 3/20* (2006.01)
*G09G 3/36* (2006.01)
*G02B 26/00* (2006.01)

(52) U.S. Cl.
USPC .......... 345/85; 345/55; 345/87; 345/204; 345/174; 359/237

(58) Field of Classification Search
None
See application file for complete search history.

(56) References Cited

U.S. PATENT DOCUMENTS

| 5,175,772 A | 12/1992 | Kahn et al. |
|---|---|---|
| 5,559,358 A | 9/1996 | Burns et al. |
| 5,729,075 A | 3/1998 | Strain |
| 5,835,255 A | 11/1998 | Miles |
| 5,835,256 A | 11/1998 | Huibers |
| 5,905,489 A * | 5/1999 | Takahama et al. ............ 345/174 |
| 5,990,473 A | 11/1999 | Dickey et al. |
| 6,034,480 A | 3/2000 | Browning et al. |
| 6,040,937 A | 3/2000 | Miles |
| 6,275,326 B1 | 8/2001 | Bhalla et al. |
| RE37,847 E | 9/2002 | Henley et al. |
| 6,509,620 B2 | 1/2003 | Hartwell et al. |
| 6,526,829 B1 | 3/2003 | Lysen et al. |

(Continued)

FOREIGN PATENT DOCUMENTS

| EP | 1 004 910 | 5/2000 |
|---|---|---|
| EP | 1 263 123 | 12/2002 |

(Continued)

OTHER PUBLICATIONS

Dumas et al., 2007, A novel approach for online sensor testing based on an encoded test stimulus, 12th IEEE European Test Symposium, pp. 105-110.

(Continued)

*Primary Examiner* — Andrew L Sniezek
(74) *Attorney, Agent, or Firm* — Knobbe, Martens, Olson & Bear, LLP

(57) ABSTRACT

Devices and methods for determining an operational state of a selected display device in an array of display devices. One method includes determining the operational state of a particular display device in the array by measuring an electrical characteristic of a plurality of the display devices, and determining the operational state based at least in part on the three measurements. In some embodiments, the electrical characteristic is capacitance, in other embodiments impedance can be the measured electrical characteristic. Such methods can be applied to interferometric modulator displays and other displays, including liquid crystal display displays.

31 Claims, 13 Drawing Sheets

U.S. PATENT DOCUMENTS

| | | | |
|---|---|---|---|
| 6,529,654 | B1 | 3/2003 | Wong et al. |
| 6,567,715 | B1 | 5/2003 | Sinclair et al. |
| 6,630,834 | B2 | 10/2003 | Min et al. |
| 6,674,562 | B1 | 1/2004 | Miles |
| 6,722,206 | B2 | 4/2004 | Takada |
| 6,771,851 | B1 | 8/2004 | Yang |
| 6,777,249 | B2 | 8/2004 | Yamazaki |
| 6,845,190 | B1 | 1/2005 | Smithwick et al. |
| 6,950,193 | B1 | 9/2005 | Discenzo |
| 6,998,851 | B2 | 2/2006 | van Spengen |
| 7,026,821 | B2 | 4/2006 | Martin |
| 7,075,700 | B2 | 7/2006 | Meunter |
| 7,123,216 | B1 | 10/2006 | Miles |
| 7,126,741 | B2 | 10/2006 | Wagner et al. |
| 7,161,728 | B2 | 1/2007 | Sampsell et al. |
| 7,187,489 | B2 | 3/2007 | Miles |
| 7,218,172 | B2 | 5/2007 | Blodgett |
| 7,289,256 | B2 | 10/2007 | Cummings et al. |
| 7,327,510 | B2 | 2/2008 | Cummings et al. |
| 7,339,384 | B2 | 3/2008 | Peng et al. |
| 7,355,936 | B2 | 4/2008 | Senshu |
| 7,359,066 | B2 | 4/2008 | Cummings et al. |
| 7,388,704 | B2 | 6/2008 | Djordjev |
| 7,412,775 | B1 | 8/2008 | Karnick et al. |
| 7,415,186 | B2 | 8/2008 | Cummings et al. |
| 7,417,735 | B2 | 8/2008 | Cummings et al. |
| 7,453,579 | B2 | 11/2008 | Kothari et al. |
| 7,525,730 | B2 | 4/2009 | Floyd |
| 7,551,159 | B2 | 6/2009 | Mignard et al. |
| 7,586,602 | B2 | 9/2009 | Maity et al. |
| 2002/0050960 | A1 | 5/2002 | Setoguchi et al. |
| 2002/0075555 | A1 | 6/2002 | Miles |
| 2002/0157033 | A1 | 10/2002 | Cox |
| 2002/0174720 | A1 | 11/2002 | Cardarelli |
| 2003/0080811 | A1 | 5/2003 | Nakatani et al. |
| 2003/0102858 | A1 | 6/2003 | Jacobson et al. |
| 2003/0164814 | A1 | 9/2003 | Starkweather et al. |
| 2004/0218341 | A1 | 11/2004 | Martin et al. |
| 2004/0223204 | A1 | 11/2004 | Mao et al. |
| 2005/0206991 | A1 | 9/2005 | Chui et al. |
| 2005/0237276 | A1 | 10/2005 | Tsuchida et al. |
| 2005/0242904 | A1 | 11/2005 | Lutz et al. |
| 2005/0286111 | A1 | 12/2005 | Muenter |
| 2006/0044298 | A1 | 3/2006 | Mignard et al. |
| 2006/0044928 | A1 | 3/2006 | Chui et al. |
| 2006/0050350 | A1 | 3/2006 | Rijks et al. |
| 2006/0067653 | A1 | 3/2006 | Gally et al. |
| 2006/0077401 | A1 | 4/2006 | Kothari et al. |
| 2006/0077523 | A1 | 4/2006 | Cummings et al. |
| 2006/0103643 | A1 | 5/2006 | Mathew et al. |
| 2006/0114243 | A1 | 6/2006 | Iwasaki |
| 2006/0243023 | A1 | 11/2006 | Wong |
| 2007/0053652 | A1 | 3/2007 | Mignard et al. |
| 2007/0075942 | A1 | 4/2007 | Martin et al. |
| 2007/0080695 | A1 | 4/2007 | Morrell et al. |
| 2007/0127186 | A1 | 6/2007 | Ivanciw et al. |
| 2007/0194414 | A1 | 8/2007 | Chou |
| 2007/0201038 | A1 | 8/2007 | Cummings et al. |
| 2008/0088638 | A9 | 4/2008 | Miles |
| 2008/0119716 | A1 | 5/2008 | Boric-Lubecke et al. |
| 2008/0150517 | A1 | 6/2008 | Khazeni |
| 2008/0158646 | A1 | 7/2008 | Cummings et al. |
| 2008/0180680 | A1 | 7/2008 | Cummings et al. |
| 2008/0303531 | A1 | 12/2008 | Cummings et al. |
| 2009/0051925 | A1 | 2/2009 | Djordjev |
| 2009/0317946 | A1 | 12/2009 | Chou |

FOREIGN PATENT DOCUMENTS

| | | |
|---|---|---|
| EP | 1 630 779 | 3/2006 |
| EP | 1 630 781 | 3/2006 |
| EP | 1 640 962 | 3/2006 |
| EP | 1 640 962 A2 | 3/2006 |
| WO | WO 01/73934 | 10/2001 |
| WO | WO 2005/022498 | 3/2005 |
| WO | WO 2006/026226 | 3/2006 |
| WO | WO 2006/036391 | 4/2006 |
| WO | WO 2006/036803 | 4/2006 |
| WO | WO 2006/036847 | 4/2006 |
| WO | WO 2007/043051 | 4/2007 |
| WO | WO 2007/124357 | 11/2007 |
| WO | WO 2007/149284 | 12/2007 |

OTHER PUBLICATIONS

IPRP dated Aug. 17, 2010 in PCT/US09/032975.

Jin et al., 1998, Electrostatic resonator with second superharmonic resonance, Sensors and Actuators A, 64:273-279.

International Business Machines Corporation: "Half contact array testing method for TFT array," Research Disclosure, Mason Publications, vol. 432, No. 167 (Apr. 1, 2000).

International Search Report dated Apr. 29, 2009 for International Application No. PCT/US2009/032975.

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani et al., "Surface Micromachined Tuneable Interferometer Array," Sensors and Actuators, pp. 17-23 (1994).

Conner, "Hybrid Color Display Using Optical Interference Filter Array," SID Digest, pp. 577-580 (1993).

Durr et al., "Reliability Test and Failure Analysis of Optical MEMS", Proceedings of the 9th International Symposium on the Physical and Failure Analysis of Integrated Circuits, pp. 201-206, (Jul. 8-12, 2002).

Raley et al., "A Fabry-Perot Microinterferometer for Visible Wavelengths," IEEE Solid-State Sensor and Actuator Workshop, Hilton Head, SC (1992).

Skaggs et al, "Automatic Testing of the Digital Micromirror Device", IEEE/LEOS 1996 Summer Topical Meetings, pp. 11-12, (Aug. 5-9, 1996).

Srikar et al., "A Critical Review of Microscale Mechanical Testing Methods Used in the Design of Microelectromechanical Systems," Society for Experimental mechanics, vol. 43, No. 3, (2003).

Castaner et al., Sep. 1999, Speed-energy optimization of electrostatic actuators based on pull-in, Journal of Microelectromechanical Systems, 8(3):290-298.

Braghin et al., 2006, Nonlinear dynamics of vibrating MEMS, Sensors and Actuators A, 134((1):98-108.

Karkkainen et al., Jun. 2004, AC voltage reference based on a capacitive micromechanical component, Precision Electromagnetic Measurements Digest, 119-120.

Mol et al., 2005, High-resolution capacitate measurement of microstructure displacement using coherent detection, Eurosensors XIX Conference, Barcelona, Spain, 4 pp.

Murakoshi et al., 2003, Electrostatically levitated ring-shaped rotational-gyro/accelerometer, Japanese Journal of Applied Physics, 42(48):2468-2472.

Panchawagh et al., 2008, Characterization of silicon parallel-plate electrostatic actuator in partially conducting aqueous solution, MEMS 2008, Tucson, AZ, pp. 495-498.

Pons-Nin et al., Jun. 2002, Voltage and pull-in time in current drive of electrostatic actuators, Journal of Microelectromechanical Systems, 11(3):196-205.

Zhang et al., Mar. 2007, Nonlinear dynamic analysis of electrostatically actuated resonant MEMS sensors under parametric excitation, Sensors Journal, 7(3):370-380.

Zhao et al., 2004, A study of dynamic characteristics and simulation of MEMS torsional micromirrors, Sensors and Actuators A, 120(1):199-210.

Cigada et al., Feb. 28, 2007, Electrical method to measure the dynamic behaviour and the quadrature error of a MEMS gyroscope sensor, Sensors and Actuators, 134(1):88-97.

Langfelder et al., 2008, Low-noise real-time measurement of the position of movable structures in MEMS, Sensors and Actuators, 148(2):401-406.

Osterberg et al., 1997, M-test: a test chip for MEMS material property measurement using electrostatically actuated test structures, Journal of Microelectricalmechanical Systems, 6(2):107-118.

Uranga et al., May 6, 2007. Electrical detection of multiple resonant modes in a CMOS-MEMS cantilever, Microelectronic Engineering 84(5-8):1374-1378.

Keeler, 2002, Fourier transformation and data processing, lecture notes, http://www-keeler.ch.cam.ac.uk/lectures/Irvine/chapter4.pdf, 18 pp.

* cited by examiner

|  | Column Output Signals | |
|---|---|---|
|  | +$V_{bias}$ | -$V_{bias}$ |
| Row Output Signals  0 | Stable | Stable |
| +ΔV | Relax | Actuate |
| −ΔV | Actuate | Relax |

US 8,466,858 B2

SENSING TO DETERMINE PIXEL STATE IN A PASSIVELY ADDRESSED DISPLAY ARRAY

CROSS REFERENCE TO RELATED APPLICATIONS

This application claims the benefit of U.S. Provisional No. 61/027,792, titled "Impedance Sensing To Determine Pixel State in A Passively Addressed Display Array," filed Feb. 11, 2008, which is incorporated by reference in its entirety.

BACKGROUND

1. Field of the Invention

The field of the invention generally relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The systems, methods, and devices described herein each have several aspects, no single one of which is solely responsible for its desirable attributes. Without limiting the scope, its more prominent features will now be discussed briefly. After considering this discussion, and particularly after reading the section entitled "Detailed Description of Certain Embodiments" one will understand how the features described herein provide advantages over conventional impedance sensing devices and methods.

In one embodiment, in an array of display devices formed in rows and columns, the array coupled to a plurality of row electrodes and a plurality of column electrodes, a method of determining an electrical characteristic of one or more selected display devices, each selected display device located in a selected row of the array and in a selected column of the array, the method comprising measuring a first value of the electrical characteristic between selected row electrodes and said plurality of column electrodes, said plurality of column electrodes being driven to a common voltage and at least a portion of non-selected row electrodes being configured in a floating state for the first value measurement, measuring a second value of the electrical characteristic between the selected column electrodes and said plurality of row electrodes, said plurality of row electrodes being driven to a common voltage and at least a portion of non-selected column electrodes being configured in a floating state for the second value measurement; measuring a third value of an electrical characteristic between selected the row electrodes and the selected column electrodes, the non-selected column and row electrodes being configured in a floating state for the third value measurement, and determining a resulting electrical characteristic or operational state of the one or more selected display devices based at least in part on the first, second, and third measured values of the electrical characteristic.

In one aspect of the embodiments, the array of display devices can comprise microelectromechanical devices. The microelectromechanical devices can comprise at least one interferometric modulator. In another aspect, the array of display devices comprises liquid crystal display (LCD) devices. In some embodiments, the selected display device can be coupled to the selected row electrode and the selected column electrode at the intersection of the selected row electrode and the selected column electrode. In some embodiments, the plurality of row electrodes can be driven to a common voltage by commonly connecting the plurality of row electrodes, and/or the plurality of column electrodes can be driven to a common voltage by commonly connecting the plurality of column electrodes. The electrical characteristic estimated or determined can be capacitance. In some embodiments where the electrical characteristic is capacitance, determining the capacitance ($C_{selected\_display\_device}$) of the selected display device comprises using the first value ($C_{first\_value}$), the second value ($C_{second\_value}$), and the third value ($C_{third\_value}$) in substantially the following relationship:

$$C_{selected\_display\_device} = \frac{1}{2}\left(C_{second\_value} + C_{third\_value} - \frac{C_{second\_value}C_{third\_value}}{C_{first\_value}}\right)$$

In some embodiments the electrical characteristic can be impedance. Also, in some embodiments, determining an operational state of the selected display device comprises comparing the electrical characteristic of the selected display device and a threshold value.

Another embodiment comprises a method of determining an operational state of a selected display device in a selected row and a selected column of an array, the array comprising a plurality of display devices each coupled to a row electrode and a column electrode of a plurality of row electrodes and a plurality of column electrodes of the display, the method comprising measuring capacitance between the selected row electrode and a plurality of commonly connected column electrodes, measuring capacitance between the selected column electrode and a plurality of commonly connected row electrodes, measuring capacitance between the selected row electrode and the selected column electrode, and determining a state of the selected display device based at least in part on said capacitance measurements.

In another embodiment, a method of estimating capacitance of a selected pixel in an array having rows and columns of display pixels comprises measuring capacitance $C_{row}$ between a row electrode coupled to the selected pixel and a plurality of column electrodes coupled to the array, the plurality of column electrodes driven to a common voltage, measuring capacitance $C_{column}$ between a column electrode coupled to the selected pixel and a plurality of row electrodes coupled to the array, the plurality of row electrodes driven to a common voltage, measuring capacitance $C_{effective}$ between the row electrode and the column electrode coupled to the selected pixel, and estimating capacitance $C_P$ of the selected pixel based at least in part on the measuring. In some embodiments, estimating capacitance $C_P$ comprises using the capacitance $C_{row}$, the capacitance $C_{column}$, and the capacitance $C_{effective}$ in accordance with substantially the following relationship (described herein below as Equation 10):

$$C_P = \frac{1}{2}\left(C_{row} + C_{column} - \frac{C_{row}C_{column}}{C_{effective}}\right)$$

Another embodiment includes a device for estimating capacitance of a selected pixel in an array of display pixels, comprising at least one driving circuit, an array of display devices, each display device being coupled to one of a plurality of first electrodes and one of a plurality of second electrodes, measuring circuitry configured to measure capacitance $C_{row}$ between a first electrode coupled to the selected pixel and a plurality of second electrodes coupled to the array, the second electrodes driven to a common voltage potential, measure capacitance $C_{column}$ between a second electrode coupled to the selected pixel and a plurality of first electrodes coupled to the array, the first electrodes driven to a common voltage potential, and measure capacitance $C_{effective}$ between the first electrode and the second electrode coupled to the selected pixel, the device further comprising capacitance estimating circuitry configured to estimate capacitance $C_p$ of the selected pixel based at least in part on said capacitance measurements.

In some embodiments, the device for estimating capacitance is configured to determine the capacitance $C_p$ using the capacitance $C_{row}$, the capacitance $C_{column}$, and the capacitance $C_{effective}$ in substantially the relationship of Equation 10 as referenced herein. The device can further include a display, a processor that is configured to communicate with the display, the processor being configured to process image data, and a memory device that is configured to communicate with the processor. The device can further comprise a driver circuit configured to send at least one signal to the display. The device can also comprise a controller configured to send at least a portion of the image data to the driver circuit. The device can also comprise an image source module configured to send the image data to the processor. In some embodiments, the image source module comprises at least one of a receiver, transceiver, and transmitter. Some embodiments can further comprise an input device configured to receive input data and to communicate the input data to the processor.

Another embodiment includes a device for estimating capacitance of a selected pixel in an array having rows and columns of display pixels, the device including means for displaying data on a plurality of display devices, the plurality of display devices formed in rows and columns and coupled to a series of row electrodes and a series of column electrodes, means for driving the data displaying means, means for measuring capacitance $C_{row}$ between a row electrode coupled to a selected pixel and a plurality of column electrodes coupled to the displaying means and driven to a common voltage potential, measuring capacitance $C_{column}$ between a column electrode coupled to the selected pixel and a plurality of row electrodes coupled to the displaying means and driven to a common voltage potential, and measuring capacitance $C_{effective}$ between the row electrode and the column electrode coupled to the selected pixel, and providing signals indicative of the capacitance measurements, and means for estimating capacitance $C_p$ of the selected pixel based at least on signals received from the measuring means and indicative of the capacitance measurements. In some embodiments, the measuring means can comprise capacitance measuring circuitry, and/or the estimating means can comprise pixel capacitance compiling logic, and/or the displaying means can comprise a plurality of interferometric modulators.

Another embodiment includes, in an array of display devices formed in rows and columns and coupled to a plurality of row electrodes and a plurality of column electrodes, a method of determining an electrical characteristic or operational state of a selected display device located in a selected row of the array, in a selected column of the array, the method including providing a predetermined first value of an electrical characteristic corresponding to a first value of the electrical characteristic between a selected row electrode and a selected column electrode, the plurality of column electrodes being driven to a common voltage and at least a portion of non-selected row electrodes floating, the selected display device being coupled to the selected row electrode and the selected column electrode, providing a predetermined second value of an electrical characteristic corresponding to a second value of the electrical characteristic between the selected row electrode and the selected column electrode, the plurality of row electrodes being driven to a common voltage and at least a portion of non-selected column electrodes floating, measuring a third value of an electrical characteristic between selected row electrode and the selected column electrode, the non-selected column electrodes and row electrodes floating, and determining a resulting electrical characteristic or operational state of the selected display device based at least in part on the first, second, and third values of the electrical characteristic.

DETAILED DESCRIPTION OF CERTAIN EMBODIMENTS

Figure 1:
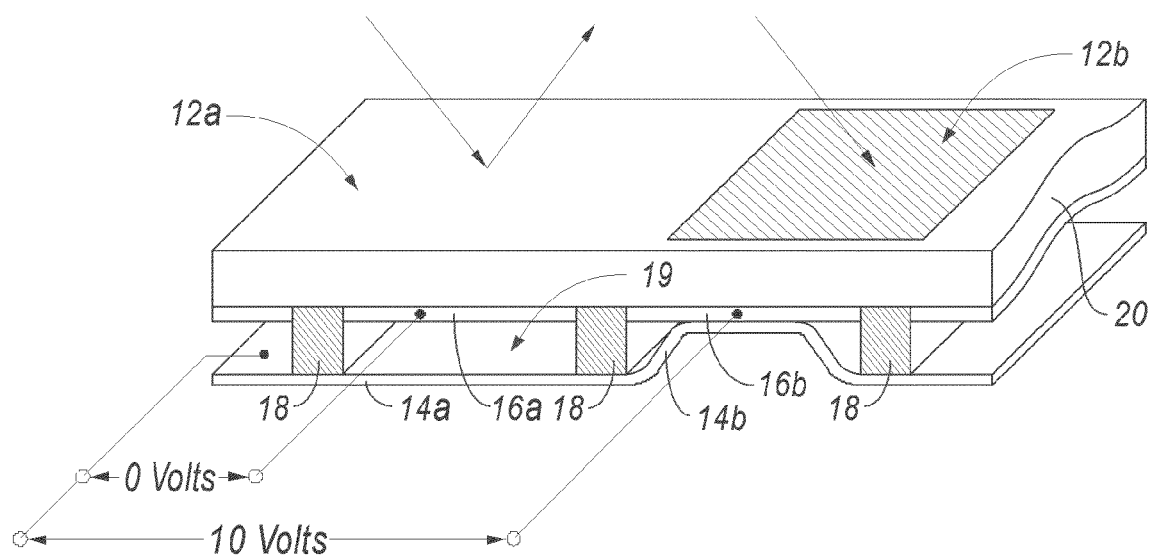
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

The following detailed description is directed to certain specific embodiments. However, the teachings herein can be applied in a multitude of different ways. In this description, reference is made to the drawings wherein like parts are designated with like numerals throughout. The embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in touch display applications, and non-display applications such as in electronic switching devices.

Passive matrix displays generally comprise row and column lines which provide drive signals to pixels located at the intersection of the row and column lines. For certain applications (e.g., performing an electrical readout of content information from the display device itself, determining the operational state of a pixel, measuring and correcting a non-uniformity of the display, performing error budget analysis) it can be desirable to sense an electrical characteristic of one or more selected pixels. In displays where the pixels comprise interferometric modulators (IMODs), the operational state of a selected pixel can be determined by measuring the capacitance of the pixel. However, the capacitance of a selected pixel may not be able to be accurately measured by simply measuring across the row line and column line of the row and column containing the selected pixel because the display forms a network of interconnected pixels, each pixel having electrical characteristics that can affect the measurement of other pixels.

Described herein are, inter alia, methods for determining an electrical characteristic of a selected pixel located at one row and at one column of a display. The electrical characteristic can indicate an operational state of the pixel. In one example where the display comprises IMODs, three capacitance measurements can be made: one measurement between a first row electrode of a selected row and a first column electrode of a selected column containing the selected pixel when some or all of the remaining column electrodes and row electrodes are "floating" (e.g., momentarily undriven); a second measurement between the first row electrode and the first column electrode when the column electrodes are at (driven to) a common voltage potential and some or all of the remaining row electrodes are left floating; and a third measurement between the first row electrode and the first column electrode when the row electrodes are at a common voltage potential and some or all of the remaining column electrodes are left floating. The resulting capacitance of the selected pixel can be determined based on these three capacitance measurements.

One interferometric modulator display embodiment comprising an interferometric MEMS display element is illustrated in FIG. 1. In these devices, the pixels are in either a bright or dark state. In the bright ("relaxed" or "open") state, the display element reflects a large portion of incident visible light to a user. When in the dark ("actuated" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) to form columns deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device. Note that FIG. 1 may not be to scale. In some embodiments, the spacing between posts 18 may be on the order of 10-100 um, while the gap 19 may be on the order of <1 um.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential (voltage) difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by actuated pixel 12b on the right in FIG. 1. The behavior is the same regardless of the polarity of the applied potential difference.

FIGS. 2 through 5 illustrate one exemplary process and system for using an array of interferometric modulators in a display application.

Figure 2:
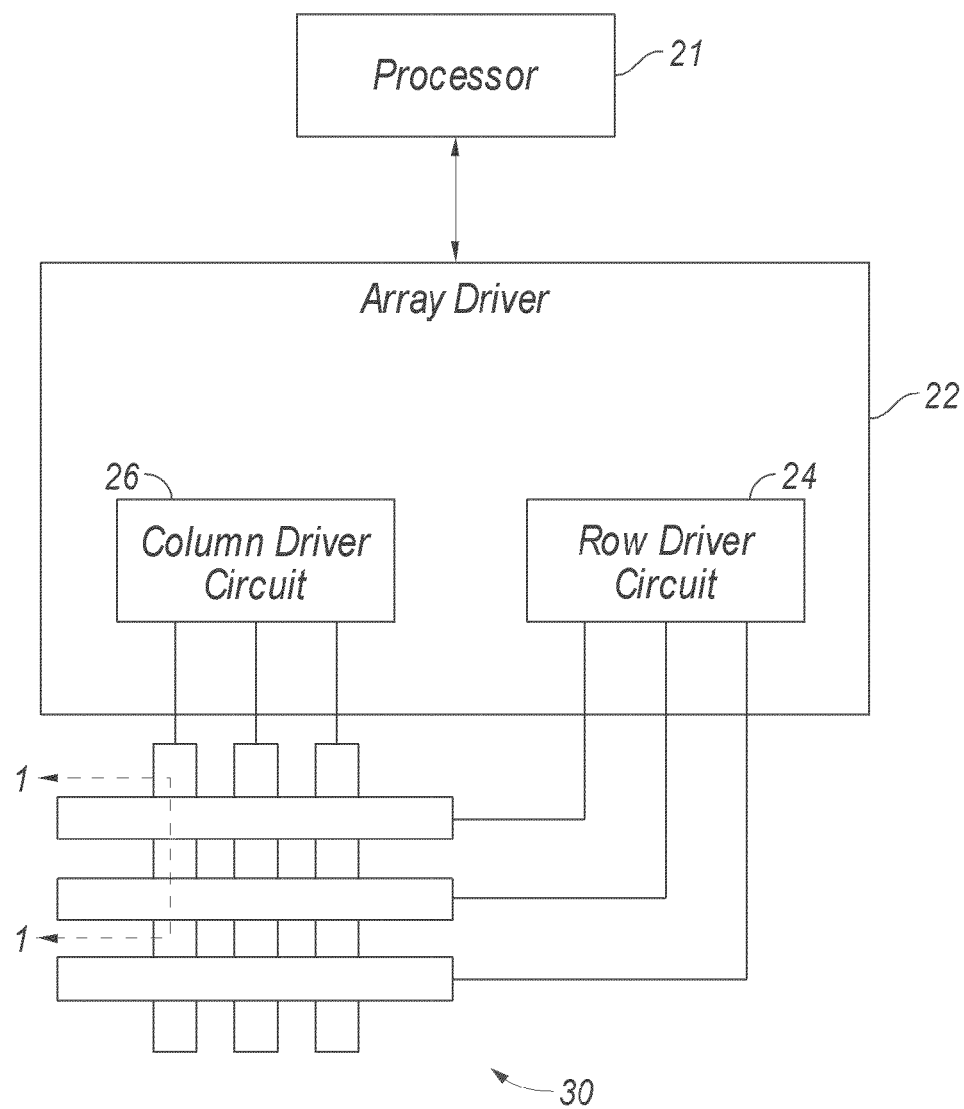
FIG. 2 is a system block diagram illustrating one embodiment of an electronic device incorporating a 3×3 interferometric modulator display.

FIG. 2 is a system block diagram illustrating one embodiment of an electronic device that may incorporate interferometric modulators. The electronic device includes a processor 21 which may be any general purpose single- or multi-chip microprocessor such as an ARM®, Pentium®, 8051, MIPS®, Power PC®, or ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. Note that although FIG. 2 illustrates a 3×3 array of interferometric modulators for the sake of clarity, the display array 30 may contain a very large number of interferometric modulators, and may have a different number of interferometric modulators in rows than in columns (e.g., 300 pixels per row by 190 pixels per column).

Figures 3, 4:
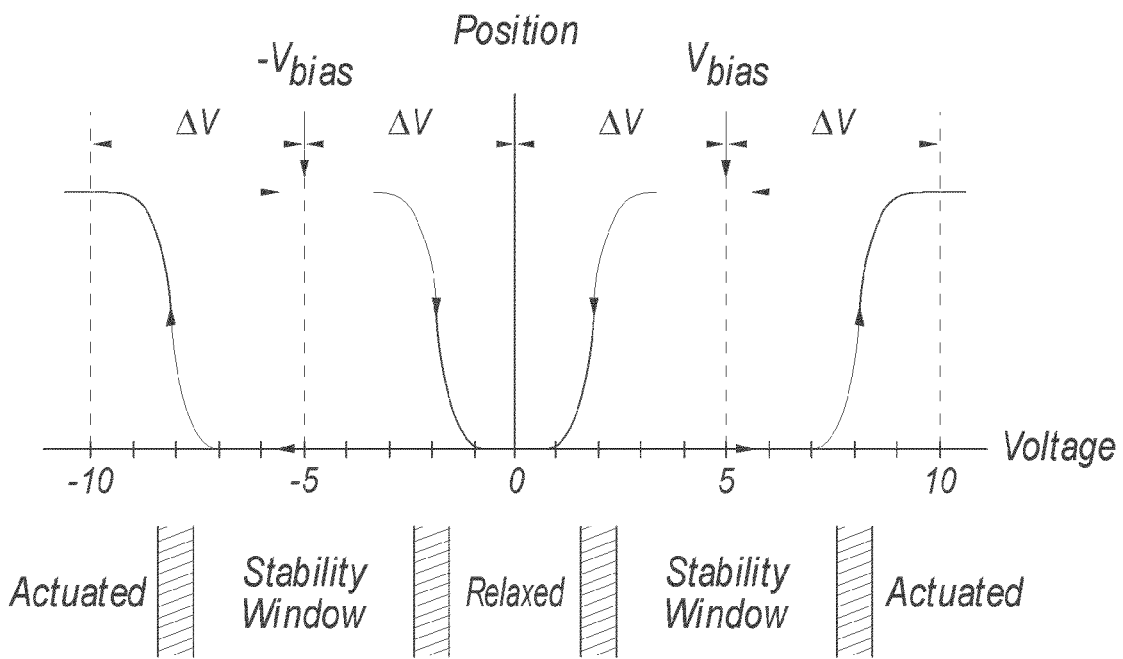
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIG. 3 is a diagram of movable mirror position versus applied voltage for one exemplary embodiment of an interferometric modulator of FIG. 1. For MEMS interferometric modulators, the row/column actuation protocol may take advantage of a hysteresis property of these devices as illustrated in FIG. 3. An interferometric modulator may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state or bias voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

As described further below, in typical applications, a frame of an image may be created by sending a set of data signals (each having a certain voltage level) across the set of column electrodes in accordance with the desired set of actuated pixels in the first row. A row pulse is then applied to a first row electrode, actuating the pixels corresponding to the set of data signals. The set of data signals is then changed to correspond to the desired set of actuated pixels in a second row. A pulse is then applied to the second row electrode, actuating the appropriate pixels in the second row in accordance with the data signals. The first row of pixels are unaffected by the second row pulse, and remain in the state they were set to during the first row pulse. This may be repeated for the entire series of rows in a sequential fashion to produce the frame. Generally, the frames are refreshed and/or updated with new image data by continually repeating this process at some desired number of frames per second. A wide variety of protocols for driving row and column electrodes of pixel arrays to produce image frames may be used.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
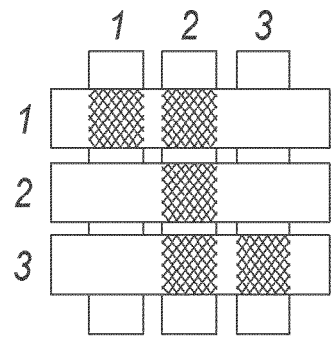
FIG. 5A illustrates one exemplary frame of display data in the 3×3 interferometric modulator display of FIG. 2.
Figure 5B:
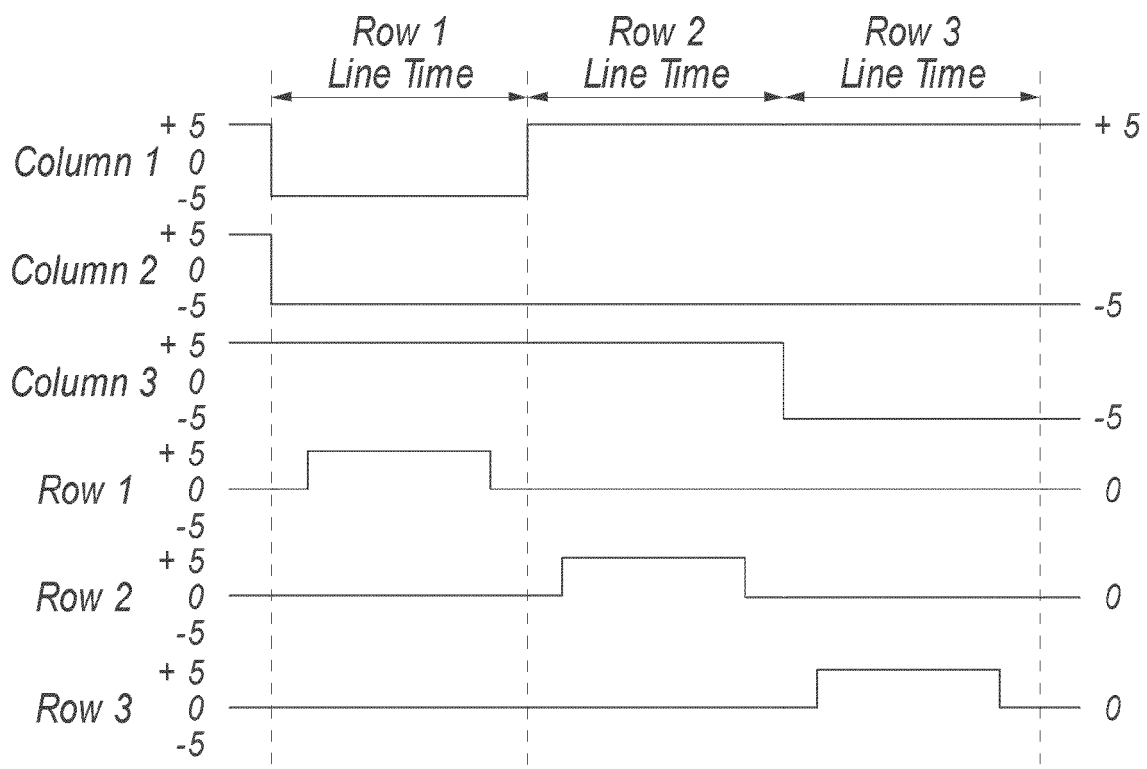
FIG. 5B illustrates one exemplary timing diagram for row and column signals that may be used to write the frame of FIG. 5A.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are initially at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
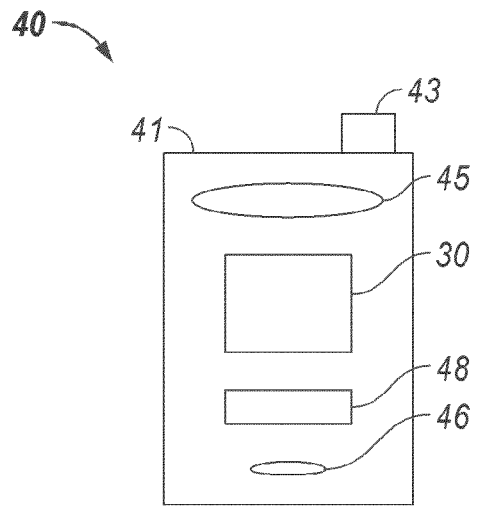
FIGS. 6A and 6B are system block diagrams illustrating an embodiment of a visual display device comprising a plurality of interferometric modulators.
Figure 6B:
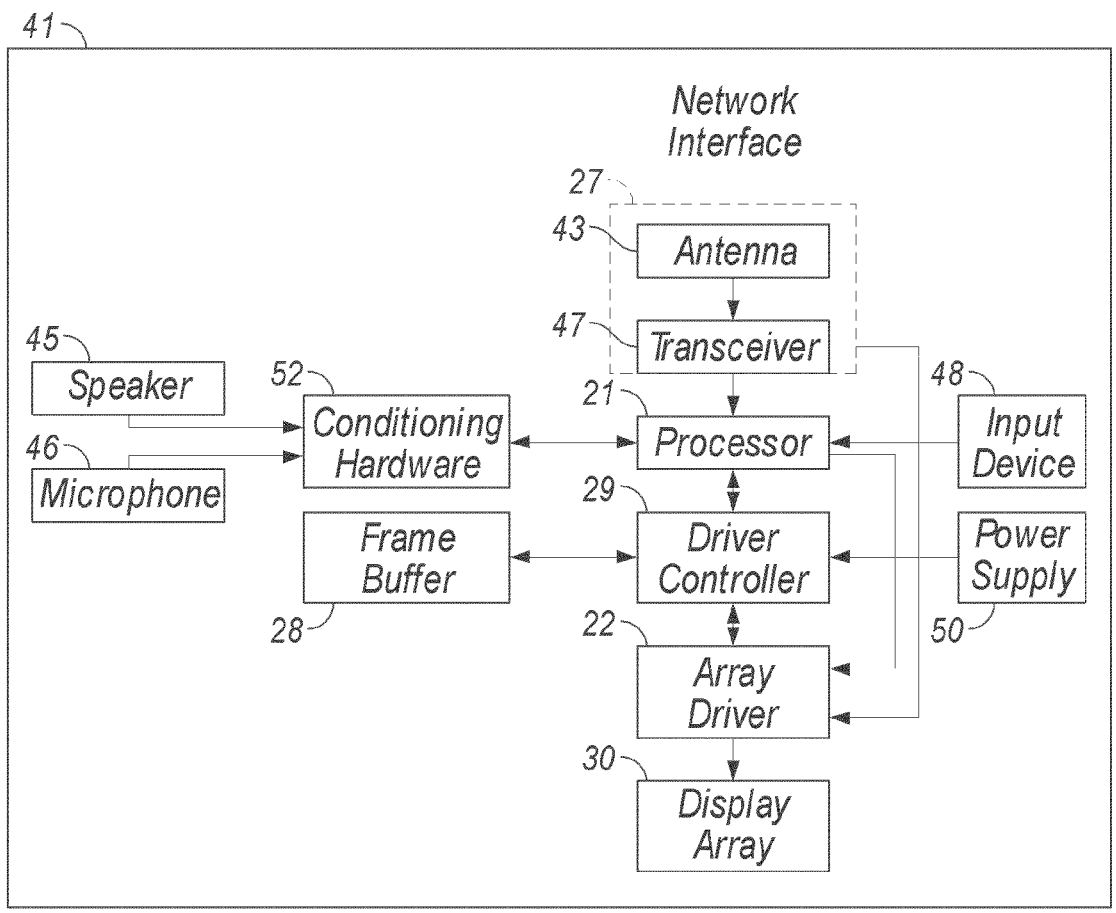

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device,. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, W-CDMA, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor Z. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. The above-described optimization may be implemented in any number of hardware and/or software components and in various configurations.

Figure 7A:
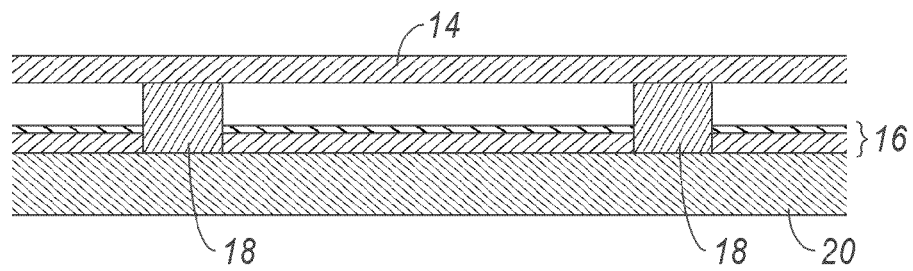
FIG. 7A is a cross section of the device of FIG. 1.
Figure 7B:
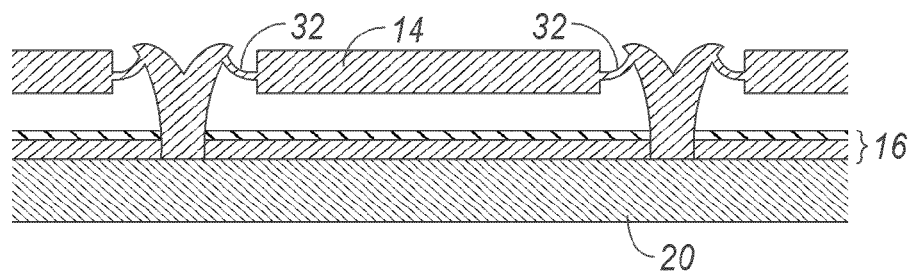
FIG. 7B is a cross section of an alternative embodiment of an interferometric modulator.
Figure 7C:
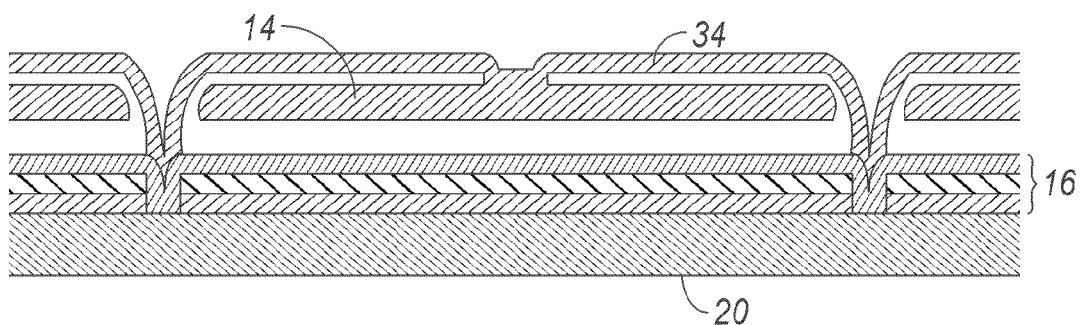
FIG. 7C is a cross section of another alternative embodiment of an interferometric modulator.
Figure 7D:
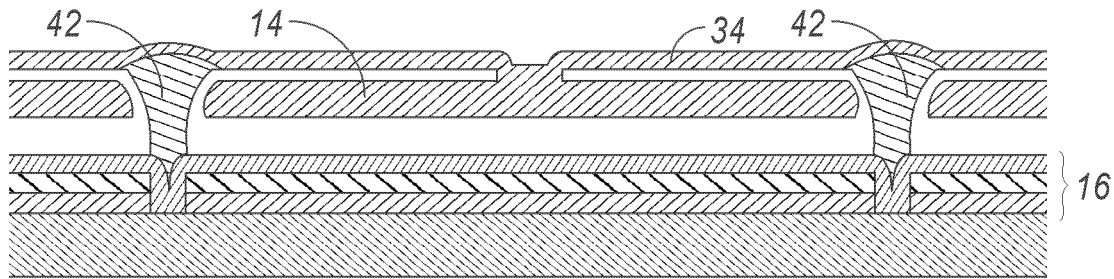
FIG. 7D is a cross section of yet another alternative embodiment of an interferometric modulator.
Figure 7E:
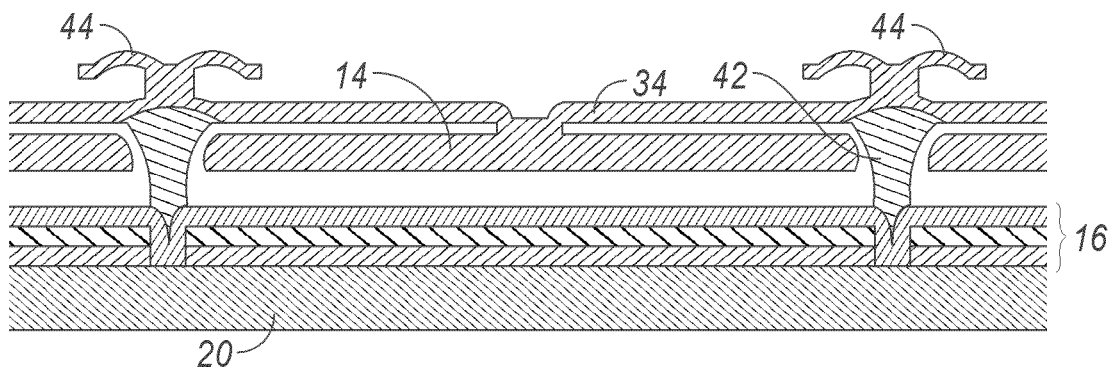
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 of each interferometric modulator is square or rectangular in shape and attached to supports at the corners only, on tethers 32. In FIG. 7C, the moveable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. For example, such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

It can be desirable to measure the capacitance of one or more selected interferometric modulators configured in a passive matrix display, for example, display 30 (FIG. 2). The measured capacitance can be used to determine operational state/content information of individual display devices (e.g., pixels), measure and correct non-uniformity of the display panel, optimize the image quality or colors of the displayed content, perform error budget analysis, or for other applications. "Operational state" and "content information" both may refer to whether the display device is in a bright ("on" or "open") state or a dark ("off" or "closed") state. Other types of passive matrix display devices may also have one or more electrical characteristics that can be measured, for example, impedance of a display device in a liquid crystal display (LCD). Electrical characteristic, as used herein, is a broad term which refers to a measurable electrical property (for example, capacitance, impedance, current, or voltage) that is associated with a display device and an array of display devices.

Figure 8:
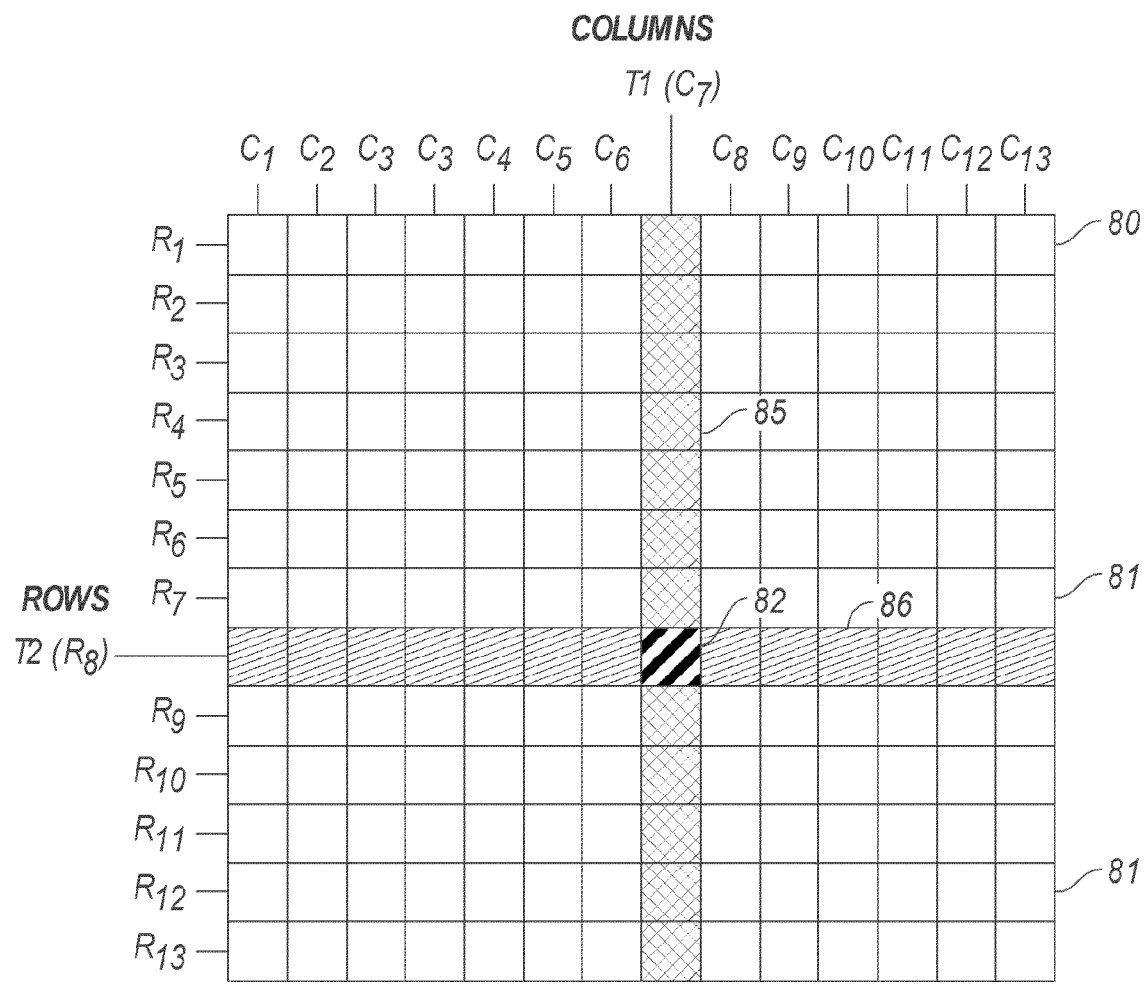
FIG. 8 is a schematic of a passive matrix display illustrating a pixel selected for capacitance measurement.

FIG. 8 illustrates an embodiment of a passive matrix display 80 that includes a plurality of display devices 81 configured as pixels in a matrix of columns and rows. Although the pixels are depicted as having a rectangular orientation, other orientations such as hexagonal pixels, non-rectangular pixels, and the like may also be used in the display 80. Each of the display devices 81 is coupled to a row electrode and a column electrode. The display devices may be disposed substantially at the intersection of the row and column electrodes. However, in some display configurations the display devices 81 may be coupled to a row and column electrode but not be disposed at the intersection of the row and column electrodes. In some examples, the display devices 81 comprise a plurality of interferometric modulator pixels configured similarly to the interferometric modulators 12a, 12b illustrated in FIG. 1. Each column electrode $C_1$-$C_{13}$ is coupled to display devices 81 in the corresponding column of the display 80, and each row electrode $R_1$-$R_{13}$ is coupled to the display devices 81 in the corresponding row of the display 80. Although 13 rows and 13 columns are depicted, the teachings herein are applicable to other configurations of X rows by Y columns where X and Y are positive integers. Driving signals may be provided through the row and column electrodes to drive the display devices 81 as described hereinabove in reference to FIGS. 2-5B.

FIG. 8 shows four regions of pixels in the display 80: a selected pixel 82 (indicated by the bold diagonal pattern) shown at the intersection of a selected row 86 and column 85; pixels in the selected column 85 (cross-hatch pattern) other than the selected pixel 82; pixels in the selected row 86 (dot pattern) other than the selected pixel 82; and pixels that are not in the selected column 85 or the selected row 86 (no pattern). In FIG. 8, T1 and T2 indicate terminal connections to lines of a selected row 86 electrode (row 8) and a selected column 85 electrode (column 7), respectively. The interferometric modulators in the display 80 are electrically interconnected such that a capacitance measurement across terminals T1 and T2 does not accurately measure just the capacitance of the selected pixel 82. Instead, this measurement can be affected by the capacitance of some or all of the pixels 81 of the display 80.

FIG. 8, and FIGS. 12-14, illustrate an example configuration with a single selected display device (pixel) 82 connected to a selected row 86 and selected column 85, and are described in particular for a single selected pixel. However, the methods and systems described herein are also applicable to configurations having more than one selected display device (e.g., a set of display devices) connected to corresponding selected row and column electrodes. In such cases, for calculation purposes in the equations described herein, the set of display devices can be treated similarly to a single display device using a plurality of associated selected rows and columns instead of a single selected row and column.

It has been found that certain capacitance measurements can be made and then associated to infer or determine (to at least a useful approximation) the capacitance of a selected interferometric modulator, or a group of selected IMODs, configured into a passive matrix display. Determining capacitance of a selected interferometric modulator display device is described herein in reference to FIGS. 9 to 14 and Equations 1 to 11. In addition, derivations of the described method are applicable to passive display devices, e.g. LCD display devices, or other types of electrically interconnected display devices.

Capacitance Calculation for One or more Selected Display Devices

Figure 9:
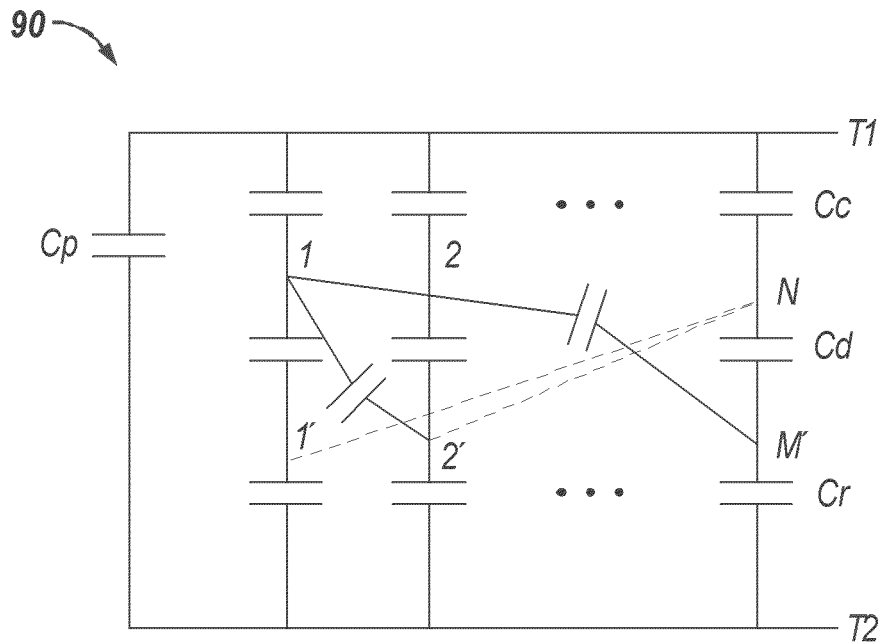
FIG. 9 is a schematic that illustrates an equivalent circuit to the circuit illustrated in FIG. 8.

FIG. 9 is a schematic illustrating an embodiment of an equivalent circuit 90 to the electrical interconnections of the display 80 shown in FIG. 8. In FIG. 9, Cp represents the capacitance of the selected pixel 82 shown in FIG. 8; Cc represents the capacitance of a pixel in the selected column 85 connected to terminal T1 shown in FIG. 8 that is not the selected pixel 82; Cr represents the capacitance of a pixel in the selected row 86 connected to terminal T2 (FIG. 8) that is not the selected pixel 82; and Cd represents the capacitance of all the other pixels in display 80 that are not in the selected row or selected column. In FIG. 9, N represents the number of remaining (or unselected) rows, and M' represents the number of remaining (or unselected) columns. For example, as illustrated in FIG. 8, the number of remaining rows is twelve ($R_1$-$R_7$, $R_9$-$R_{13}$), and the number of remaining columns is also twelve ($C_1$-$C_6$, $C_8$-$C_{13}$).

In some embodiments, when the non-selected row electrodes or column electrodes are connected, it can be advantageous to have all of the non-selected rows/columns connected, and the embodiment is as described above with T1 being one electrode and T2 being one electrode. However, some embodiments divide the both the row electrodes and the column electrodes into two groups, a selected group and a non-selected group of row electrodes, and a selected group and a non-selected group of column electrodes. The electrodes can be grouped in any manner, for example, adjacent groupings or non-adjacent groupings. For example, some of the column electrodes and some of the row electrodes (non-selected) can be floating, while all the remaining (selected) column and row electrodes are connected to T1 and T2 respectively. In this example, $C_{pixel}$ in the above equations now becomes the capacitance of all the pixels in the region of intersection, and likewise for the other three regions.

The groups of selected and non-selected electrodes need not be continuous in space (e.g., adjacent) because from the perspective of electrical behavior, the relative positions of these electrodes does not affect the resulting capacitance. Instead, selected electrodes can be grouped together, and non-selected electrodes can be grouped together regardless of their physical position without resulting in any significant change to the electrical behavior.

In the embodiment illustrated in FIG. 9, the pixels of the selected column 85 (FIG. 8) are connected to terminal T1. Likewise, all the pixels of the selected row 86 (FIG. 8) are connected to terminal T2. Pixels not in the selected column or row are represented in FIG. 9 as connections between every terminal marked 1, 2, . . . , N to every terminal marked 1', 2', . . . , M'. In other words, there is a pixel for every pair (1 . . . N, 1' . . . M'). Because the capacitance of a pixel change depending on content displayed on the pixel (e.g., whether an IMOD pixel is actuated or relaxed), content displayed on the display 80 will cause capacitance differences in different pixels across the display 80. However, such capacitance differences based on content can be ignored for the sake of simplification. In some implementations, content based differences can be ignored if the capacitance is measured under testing conditions where the content is controlled to obviate capacitive differences caused by the display content.

Figure 10:
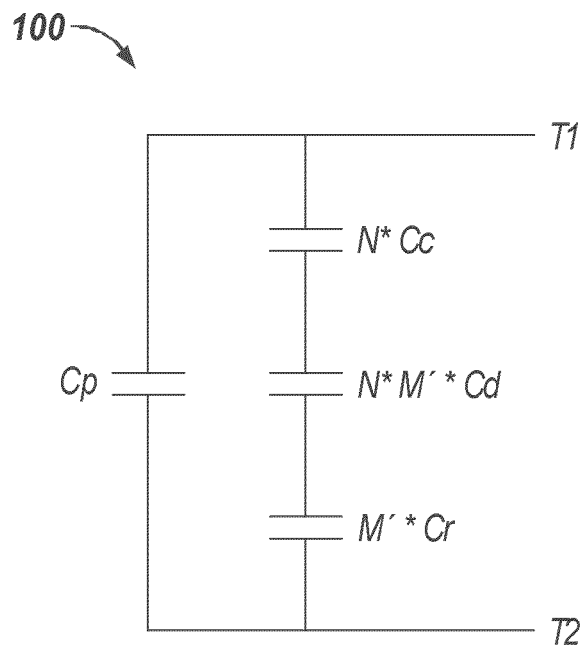
FIG. 10 illustrates a simplified circuit equivalent to the circuit illustrated in FIG. 9.

FIG. 10 illustrates a simplified circuit 100 equivalent to the circuit 90 illustrated in FIG. 9 with the assumption that in each of the four regions of pixels in display 80 (FIG. 8), each pixel in each region has the same capacitance as the other pixels in that region. The capacitance of circuit 100 can be determined by Equation 1, shown below $$C_{effective} = C_{pixel} + \left( \cfrac{1}{\cfrac{1}{(N_c-1)C_{row-pixel}} + \cfrac{1}{(N_r-1)C_{col-pixel}} + \cfrac{1}{(N_c-1)(N_r-1)C_{other-pixel}}} \right) \quad [1]$$

where $N_C$ is the number of columns (M'+1); $N_r$ is the number of rows (N+1); $C_{pixel}$ is the capacitance of the intersecting pixel; $C_{col-pixel}$ is the capacitance of a pixel in the selected column 85 but not the selected pixel 82; $C_{row-pixel}$ is the capacitance of a pixel in the selected row 86 but not the selected pixel 82; and $C_{other-pixel}$ is the capacitance of "other" pixels in the remaining region (the pixels in the non-selected rows and columns).

Equation 1 illustrates that the measured capacitance between T1 and T2 may be significantly different than the capacitance of the selected pixel 82. For example, if the number of rows and columns in the display are both 100, and only one row line and one column line are selected, and all the pixels have the same capacitance, the measured capacitance will be 50.25 times the capacitance of a single pixel. The above calculation assumes that adjacent column-to-column and row-to-row capacitances and the effect of trace resistances are ignored.

The effect of the term $C_{other-pixel}$ may be much smaller than that of the other terms in Equation 1 because the number of "other" pixels may be large. Accordingly, the effect of the other pixels in a non-selected row and column can be ignored, which results in a further simplified equation:

$$C_{effective} = C_{pixel} + \left( \cfrac{1}{\cfrac{1}{(N_c-1)C_{row-pixel}} + \cfrac{1}{(N_r-1)C_{col-pixel}}} \right) \quad [2]$$

When the different regions of pixels in the display 80 have different capacitances (which may be the case when some content is present on the display and the various pixels are not all in the same state, some being actuated and some being unactuated), Equation 2 becomes:

$$C_{effective} = C_{pixel} + \left( \cfrac{1}{\cfrac{1}{\sum_{i=1}^{N_c-1} C_{row-pixel(i)}} + \cfrac{1}{\sum_{j=1}^{N_r-1} C_{col-pixel(j)}}} \right) \quad [3]$$

Although Equation 3 assumes that all the pixels in the non-selected rows and columns of FIG. 8 have the same capacitance, Equation 3 is still approximately valid when the pixels in the non-selected rows and columns have different capacitances, such as when varying content is displayed across the pixels. Also, Equation 3 assumes the total number of pixels on the display 80 is not small (e.g., greater than about 10 per side and not as small as say 3×4, or 4×9). Examples of applicable pixel display resolutions include, but are not limited to, 160×140, 640×480, and 1920×1080. Other applicable pixel display resolutions can be larger or smaller than these resolutions.

If the capacitance $C_{effective}$ is measured for each pixel (e.g., for each row-column combination), then there are Nc*Nr equations and Nc*Nr unknowns (e.g., a $C_{pixel}$ for each pixel). Although it is possible to solve the equations to compute the capacitance of every pixel, the solution may be complicated because there are Nc*Nr linear equations to solve. The two summations in Equation 3 include all the pixels of the display 80 except for the selected pixel 82. Alternatively, the summations can be rewritten to include all the pixels in the display 80 and the capacitance of the selected pixel could be subsequently subtracted, as shown in Equation 4:

$$C_{effective} = C_{pixel} + \left( \cfrac{1}{\cfrac{1}{\sum_{i=1}^{Nc} C_{row-pixel(i)} - C_{pixel}} + \cfrac{1}{\sum_{i=1}^{Nc} C_{col-pixel(j)} - C_{pixel}}} \right) \quad [4]$$

Renaming terms of Equation 4, as shown in Equations 5 and 6, $$C_{row} = \sum_{i=1}^{Nc} C_{row-pixel(i)} \quad [5]$$

$$C_{column} = \sum_{j=1}^{Nc} C_{col-pixel(j)} \quad [6]$$

results in a simplification of Equation 4, as shown below in Equation 7.

$$C_{effective} = C_{pixel} + \left( \cfrac{1}{\cfrac{1}{C_{row} - C_{pixel}} + \cfrac{1}{C_{column} - C_{pixel}}} \right) \quad [7]$$

Equation 7 can be further simplified, as shown in Equation 8.

$$C_{effective} = C_{pixel} + \left( \cfrac{C_{row}C_{column} - C_{pixel}^2}{C_{row} + C_{column} - 2C_{pixel}} \right) \quad [8]$$

Since $C_{pixel}$ is much less than $C_{row}$ and $C_{column}$ for typical display resolution, Equation 8 can be approximated by Equation 9.

$$C_{effective} = C_{pixel} + \left( \cfrac{C_{row}C_{column}}{C_{row} + C_{column} - 2C_{pixel}} \right) \quad [9]$$

Rewriting Equation 9 to solve for $C_{pixel}$ results in Equation 10.

$$C_{pixel} = \cfrac{1}{2}\left( C_{row} + C_{column} - \cfrac{C_{row}C_{column}}{C_{effective}} \right) \quad [10]$$

In this example, capacitance of a selected pixel ($C_{pixel}$) can be inferred from the measured capacitance $C_{effective}$, by separately measuring the capacitance of each row and column containing the pixel. If there are Nc columns and Nr rows forming a display having (Nc*Nr) pixels, the number of capacitance measurements that may be needed to measure values of all (Nc*Nr) pixels is Nc+Nr+Nc*Nr. Accordingly, the number of measurements per pixel is $$\left(1 + \frac{N_c + N_r}{N_c N_r}\right) \quad [11]$$

which is approximately one for relatively large arrays (e.g., Nc and/or Nr>50).

CERTAIN EXAMPLES OF DETERMINING AN ELECTRICAL CHARACTERISTIC

Figure 11:
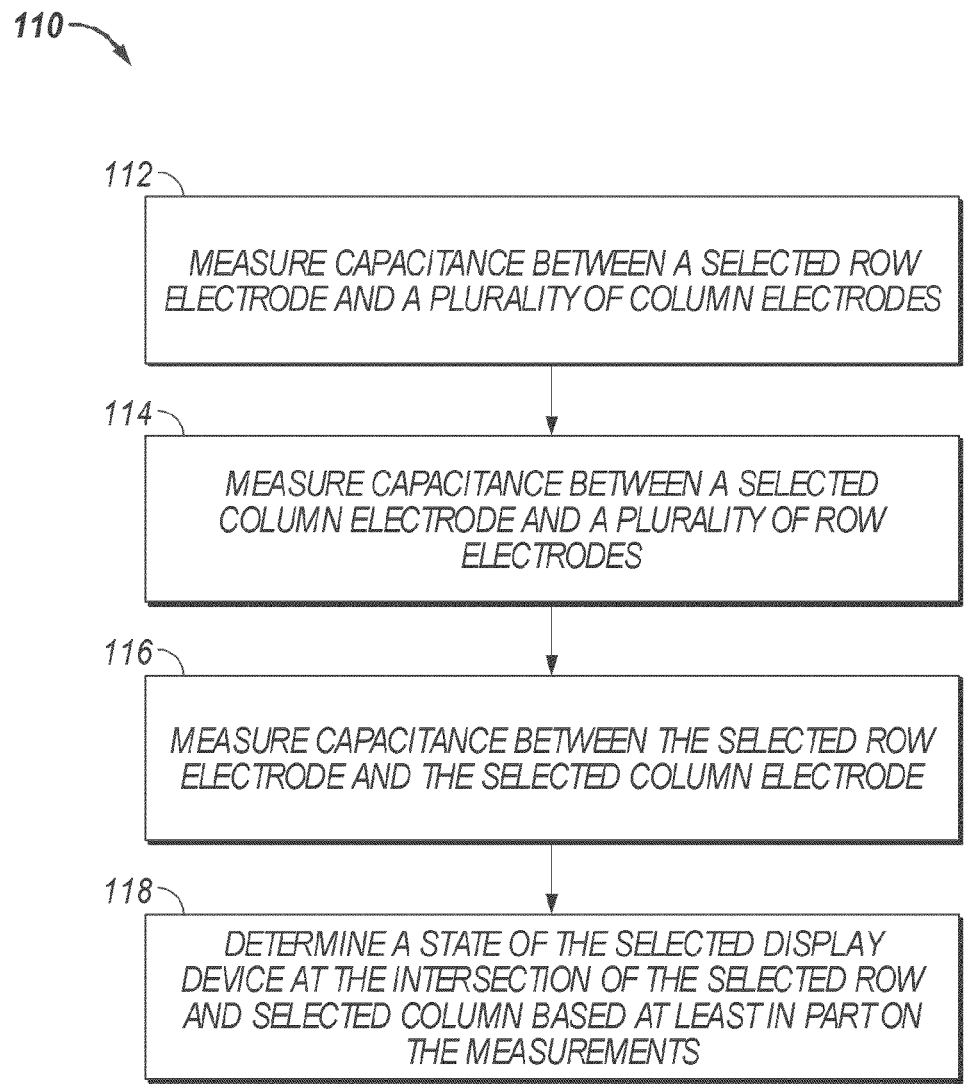
FIG. 11 is flowchart illustrating an exemplary process of determining an operational state or an electrical characteristic of a selected display device in a passive matrix display.

FIG. 11 illustrates an exemplary process 110 of determining an electrical characteristic or operational state of one or more selected display device (e.g., pixels) each display device being located in a selected row and a selected column of a passive matrix display comprising a plurality of display devices and a plurality of row and column electrodes. In some embodiments, each display device is coupled to a row and column electrode at the intersection of the row and column electrodes. Other examples of this process can determine an electrical characteristic (e.g., capacitance, impedance) or operational state (e.g., actuated, unactuated) for a plurality of display devices.

Figure 12:
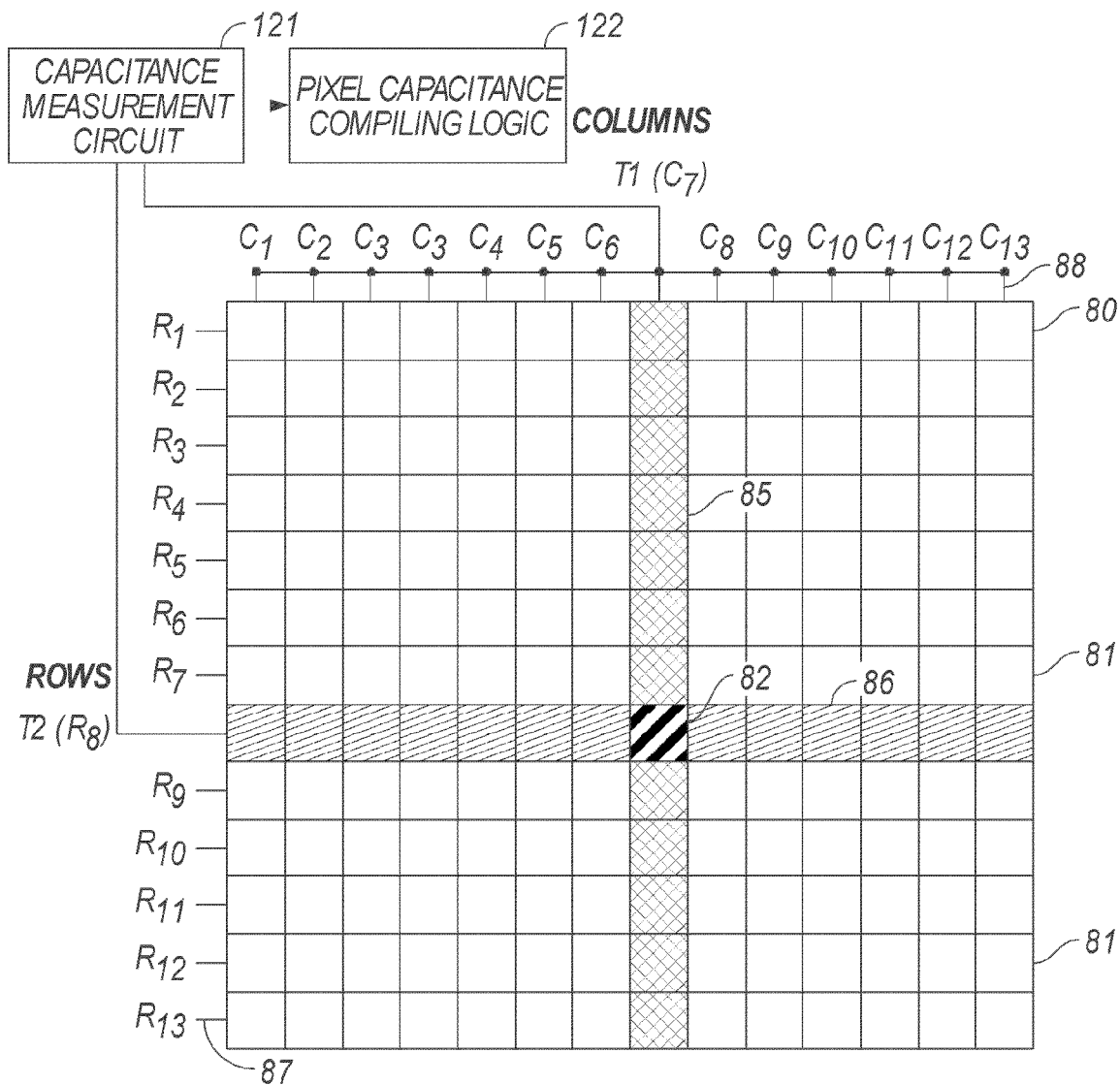
FIG. 12 is a schematic illustrating an exemplary capacitance measurement across the terminals of a selected row electrode and a column electrode when the column electrodes are driven to a common voltage and the remaining row electrodes are left floating.

At step 112, the process 110 begins by measuring capacitance between the selected rows electrodes and a plurality of column electrodes, where the plurality of column electrodes are at a common voltage. This can be achieved by commonly connecting the column electrodes, or by driving the column electrodes to a common voltage. FIG. 12 illustrates an example of a display 80 configured for such a measurement when there is one selected display device. Display 80 includes a plurality of display devices 81 configured in a 13×13 matrix display. Selected pixel 82 is located in selected row 86 and selected column 85 of display 80. In some embodiments, instead of measuring the capacitance, a predetermined value is used in place of the capacitance measurement. The predetermined value can be previously derived through experimentation, or theoretically derived. In embodiments having more than one elected display device, the corresponding selected rows and columns are treated, as a set, similarly to the selected single row and column illustrated in FIG. 12 and described herein. For example, if the selected display devices were in columns $C_6$ and $C_7$ and $R_7$ and $R_8$, the selected set of columns would be $C_6$ and $C_7$ and selected set of rows would be $R_7$ and $R_8$.

As illustrated in FIG. 12, a capacitance measurement circuit 121 measures capacitance between an electrode terminal T1 of the selected column 85 and an electrode terminal T2 of the selected row 86. In this embodiment, the row electrodes 87 indicate row electrodes other than the selected row electrode. The row electrodes 87 are left "floating." This can be done, in some embodiments, by using tristate drivers (not shown) in the capacitance measurement circuit 121.

Still referring to FIG. 12, pixel capacitance compiling logic 122 can receive a signal indicative of the capacitance measurement from the capacitance measurement circuit 121. The signal may be analog, digital, coded digital, or the like. The pixel capacitance compiling logic 122 can use the signal, along with other capacitance measurements (described further below) to determine an electrical characteristic of the selected pixel 82, and/or the operational state of the selected pixel 82.

Column electrodes 88 may be commonly connected when measuring the capacitance between T1 and T2. All of the column electrodes 85 are commonly connected in FIG. 12. In other embodiments a plurality, but not necessarily all, of the electrodes are connected for this measurement. In some embodiments, driving circuitry (e.g., array driver 22, FIG. 2) can be configured to drive the individual column electrodes to a common voltage.

In an exemplary embodiment, the capacitance measurement circuit 121 illustrated in FIG. 12 is implemented in display driving circuitry, for example, in the array driver 22 (FIG. 2). The capacitance sensing circuit 121 could be incorporated into the row and column driver circuits, or could be separate from them. Such circuitry can include functionality to commonly connect the column electrodes 88, and/or drive selected (or all) of the column electrodes 88 to a common voltage during the measurement. Pixel capacitance compiling logic 122 can also be incorporated in the array driver 22, or it can be implemented in another device in communication with the capacitance measurement circuit 121, for example, processor 21 (FIG. 2). The capacitance measurement circuit 121 and the capacitance compiling logic 122 can be implemented in hardware, software, firmware, or a combination thereof.

The capacitance measurement circuit 121 illustrated in FIG. 12 can take a wide variety of forms. In one embodiment, the capacitance measurement circuit 121 grounds one terminal (e.g., T1) and applies a DC bias voltage with an added relatively small AC waveform to the other terminal (e.g., T2). The applied DC bias may be within the hysteresis curve as described above and therefore maintains the pixel in its current state. Because the impedance between the terminals is capacitive, no DC current flows between the terminals. However, AC current flow will occur through the capacitive coupling. This AC current through the circuit can be measured by the capacitance measurement circuit 121. The AC current that flows in the circuit under these conditions will be dependent on the capacitance between the two terminals, with higher capacitance producing higher current flow for the same applied voltage level. In this way, a capacitance measurement between the two terminals of the capacitance measurement circuit 121 can be performed without disturbing the state of the selected pixel 82. Other methods are also possible, for example, measuring the RC time constant with a known R, measuring by constant current charging, and comparing with known reference capacitances.

Referring again to FIG. 11, at step 114 process 110 continues by measuring the capacitance between the selected column electrodes and a plurality of row electrodes configured to be at a common voltage. This can be achieved, for example, by commonly connecting the row electrodes or by driving the row electrodes to a common voltage. In some embodiments, instead of measuring the capacitance, a predetermined value is used for this capacitance measurement. This predetermined value can be previously derived through experimentation, or theoretically derived.

Figure 13:
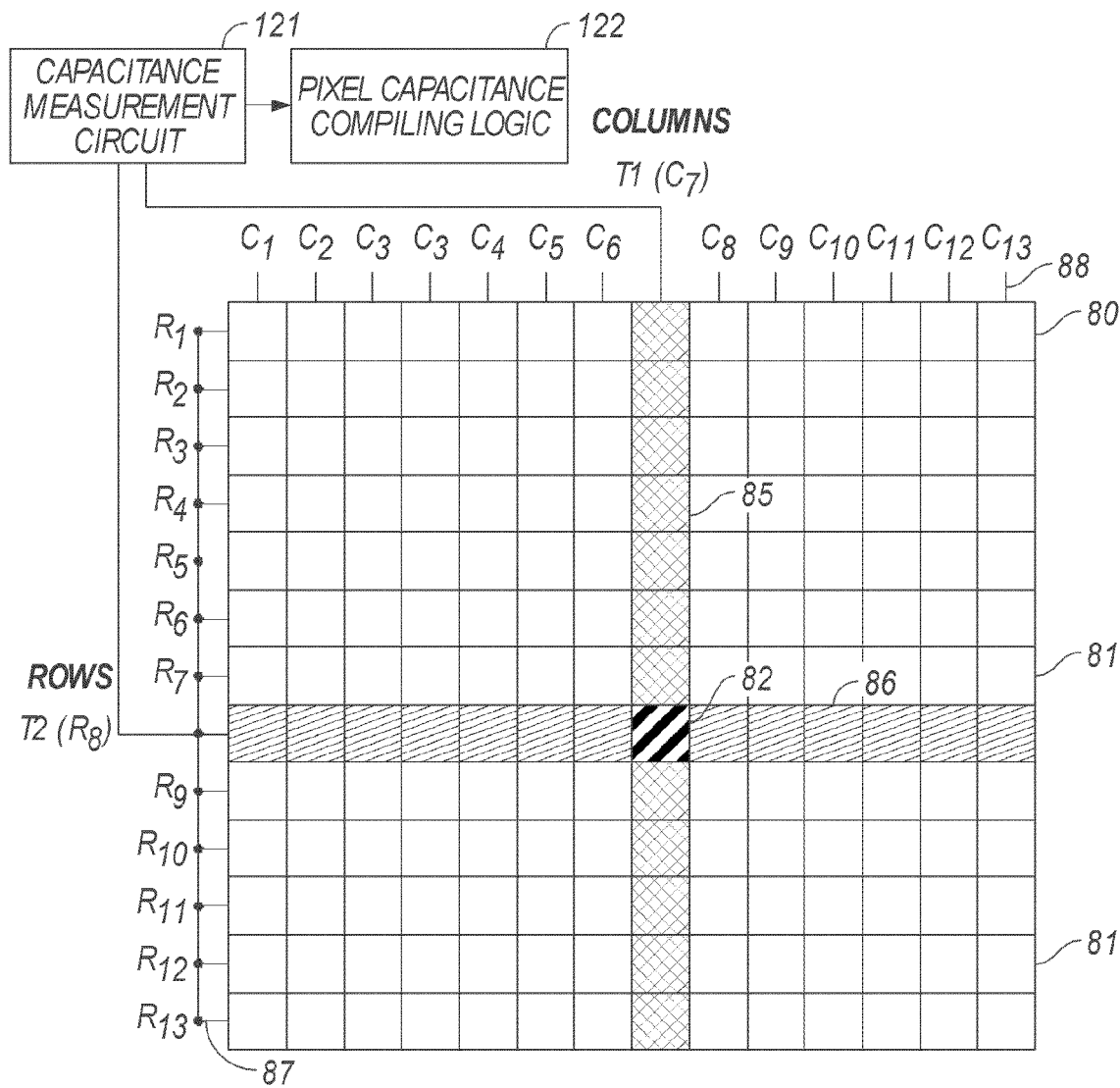
FIG. 13 is a schematic illustrating an exemplary capacitance measurement across the terminals of a selected row electrode and a column electrode when the row electrodes are driven to a common voltage and the remaining column electrodes are left floating.

FIG. 13 illustrates the display 80 shown in FIG. 12 in an exemplary configuration for the measurement of step 114. In FIG. 13, the plurality of row electrodes 87 are commonly connected. Capacitance is measured between the commonly connected row electrodes at terminal T1 and the selected column electrodes at terminal T2. For this measurement, the remaining common electrodes are left floating. The capacitance is measured by the capacitance measurement circuit 121, which provides a signal indicative of the capacitance value to the pixel capacitance compiling logic 122.

Figure 14:
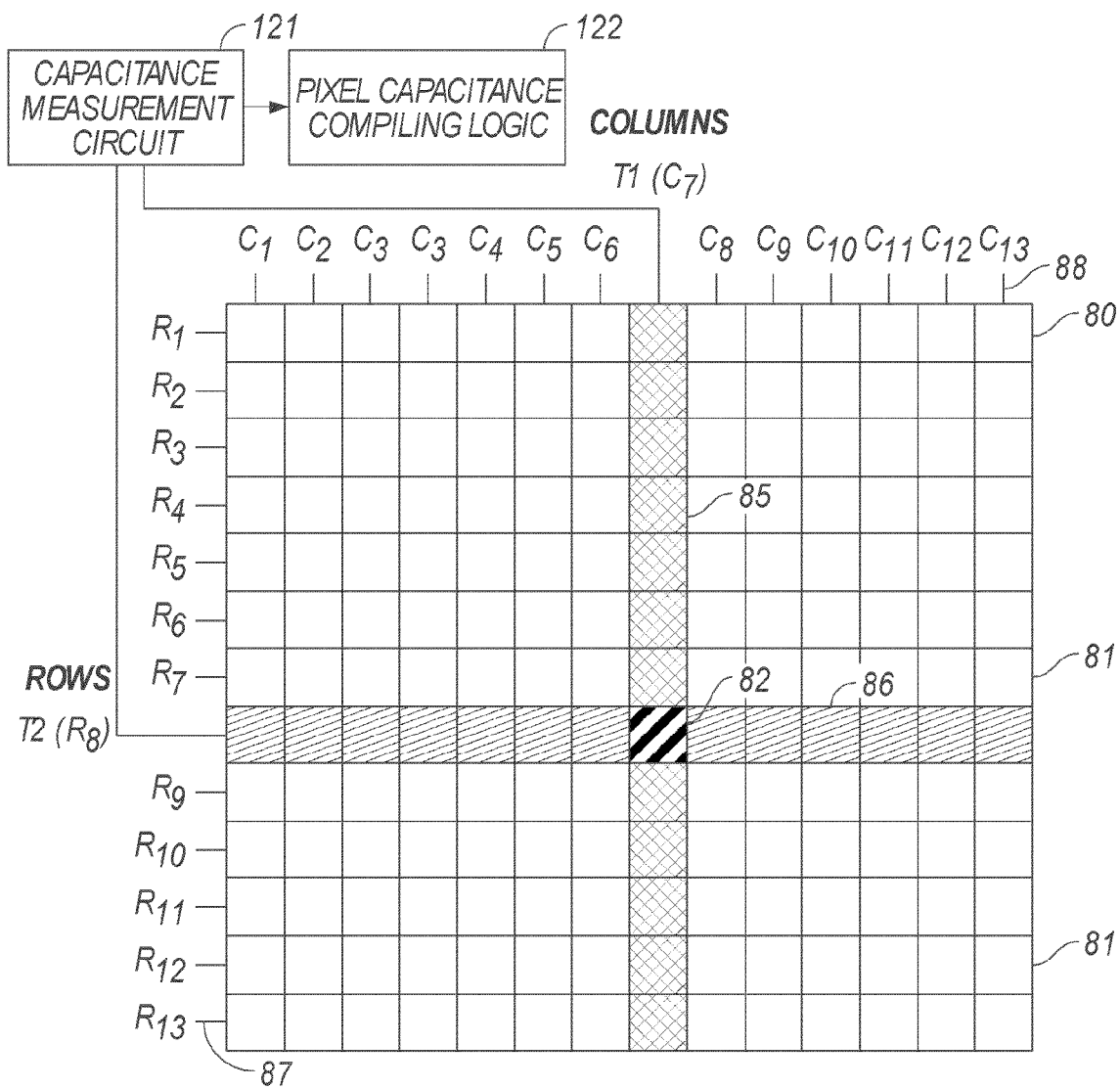
FIG. 14 is a schematic illustrating an exemplary capacitance measurement across the terminals of a selected row and column when remaining row electrodes and column electrodes are left floating

Referring back to FIG. 11, the process 110 proceeds to step 116 and where capacitance is measured between the selected column electrodes and the selected row electrodes. An example of a configuration for this capacitance measurement is illustrated in FIG. 14, which shows the display 80 (previously shown in FIGS. 12 and 13) in a different electrical configuration. In FIG. 14, the capacitance measurement circuit 121 measures the capacitance between terminals T1 and T2 when the remaining columns and row electrodes are left floating. The capacitance measurement circuit 121 then provides a signal indicative of this measurement to the pixel capacitance compiling logic 122.

At step 118 process 110 continues to determining a state of the selected display device 82 at the intersection of the selected row and selected column based at least in part on the previous measurements described in steps 112 to 116. The pixel capacitance compiling logic 122 can perform this step using, for example, Equation 10 (rewritten as Equation 11 below in terms of a measured first capacitance value $C_{first\_value}$ ($C_{row}$) a second capacitance value $C_{second\_value}$ ($C_{column}$) and a third capacitance value $C_{third\_value}$ ($C_{effective}$)) to determine the resulting capacitance.

$$C_{selected\_display\_device} = \frac{1}{2}\left(C_{first\_value} + C_{second\_value} - \frac{C_{first\_value}C_{second\_value}}{C_{third\_value}}\right) \quad [11]$$

The operational state of the selected display device(s) can be determined by comparing the resulting capacitance (e.g., from Equation 11) to a predetermined capacitance threshold value. For example, for a pixel comprising an interferometric modulator, the predetermined capacitance value can be a value between the capacitance value of an interferometric modulator in the actuated state and one in the unactuated state. Comparing the resulting capacitance can then determine whether the selected interferometric modulator is actuated or released.

The above-described method and described equations were derived where an effective pixel capacitance is measured between one column and one row. However, as indicated above the same methodology is applicable if a plurality of rows and/or columns are selected, by using derivations of the equations described herein. Also, the above-described measurement steps for determining an electrical characteristic (e.g., capacitance or impedance) or operating state can be performed in any order.

In some embodiments of a method of determining the operational state or an electrical characteristic of a display device, a single measurement of the selected row (or group of rows) and the selected columns (or group of columns) can be made while the non-selected rows and columns are left floating. For example, only $C_{effective}$ is measured as described in paragraphs 85 and 86 above. Estimated values are used for the other two measurements $C_{row}$ and $C_{column}$. The estimated values can be predetermined values based on experimental results or theoretically calculated values. In such embodiments, the operational state may be determined faster due to the fewer required measurements.

Although the exemplary systems and methods are described as utilized to measure and determine capacitance, other electrical characteristics can also be determined. For example, the methods may determine impedance of a pixel. The described systems and methods can be applied to display devices in monochrome, bi-chrome, or color displays. It is also possible to determine the operational state of each pixel in a display and read out a color image from a display panel.

The methods and systems described herein determine the capacitance of a pixel, which can be indicative of pixel intensity. Accordingly, using these methods and systems, the intensity of each pixel can be determined which corresponds to the content image on the display.

Display technologies often suffer from manufacturing non-uniformity in the display devices across the display pixel-array (ignoring, for this discussion, the non-uniformity that may originate from the drive circuitry or non-zero resistance of the electrodes in the pixel array.) These non-uniformities may exist in the form of variation in pixel-intensity-to-voltage curve which would mean that a uniform grayscale or color is not obtained when all the pixels are driven with the same voltage. For IMODs, non-uniformity may exist in the form of variation of hysteresis voltages across the array. The systems and methods described in this invention can also be used to measure an electrical characteristic of display devices in a display, and apply a non-uniformity correction to all or a portion of the display devices based on the measurements.

In one example, correction may be applied using a suitable set of electrical tuning parameters of the display element(s) (e.g., bias and offset voltages for IMODs) which means that the different IMODs in the array are driven with different drive-scheme voltages based on the characteristics of the specific IMOD driven. The correction can be applied to a set of display devices to maximize or approximately maximize the number of display devices having an intended response; or alternatively, minimize or approximately minimize the number of display elements with an unintended response.

In another example of applying a correction, different electrical tuning parameters are applied to different parts of the display. Either of these two approaches can involve historical data of the display devices that was measured and saved. As an example, IMOD devices are subject to charging over the time resulting in a shift of the offset voltage of the device specific to the drive history of that specific device. The system and methods described in this invention may be used to track the offset voltage of the device over the time and the suitable drive voltages may be chosen accordingly. The historical data can be either complete or cumulative behavior of one or more display devices, or sets of display devices. Alternatively, only certain statistics representing behavior of the display devices could be retained, e.g., mean behavior, or behavior of extreme display devices (operating outside of normal operational parameters).

The methods described herein can be applied in many other ways to a passive matrix display comprising a variety of display devices, for example, IMODs, and LCDs. In one example, image quality or colors of displayed content can be optimized. This optimization may include white balance. Such methods can adjust displays to account for the color of the display, as it may be affected by temperature for example. If an electrical characteristic of a display device is dependent on temperature, measuring or estimating the electrical characteristic can also be used to infer the temperature. Electrical tuning parameters (e.g., DC or operational) of selected display devices, for example, in different parts of the display can be determined, and then the tuning parameters can be applied to the entire display. The selected display devices can relate to different portions of the display. This can be done to compensate for effects of aging, temperature, or other reasons. For LCD and other display technologies, the gamma curve of a display may be measured and provided for use by the display drive circuitry. The methods can also be used to ease error budgeting requirements for tuning the display panel.

Other applications include measuring the response time of the display elements in the panel and using the results to run the display at the fastest possible speed, or to slow it down if necessary. Such measurements of response time can also be done as a function of physical parameters that affect the response times, for example, air pressure in the device, or temperature. In addition, the methods can be applied to measure or detect crosstalk effects in the display that result in false actuations and releases of IMODs in a display, for example. Testing and characterization of a display can be performed with the display drive circuitry attached to the display. This can include line and pixel-level defect screening of the display panel based on electrical sensing techniques described herein. Such defect screening can be based on measurement of capacitance of one or more display devices, continuity or resistance of the same, and/or also based on leakage in the display element(s).

In any of the processes specifically described above, one or more steps may be added, or a described step deleted, without departing from the methods described herein. Information and signals described herein may be represented using any of a variety of different technologies and techniques. The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or combinations thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In addition, the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The steps of a method or algorithm described in connection with the examples disclosed herein may be embodied directly in hardware, in a software module executed by a processor, or in a combination of the two. A software module may reside in a computer readable memory such as RAM memory, flash memory, ROM memory, EPROM memory, EEPROM memory, registers, hard disk, a removable disk, a CD-ROM, or any other form of storage medium known in the art. An exemplary storage medium may be coupled to the processor such that the processor can read information from, and write information to, the storage medium. In the alternative, the storage medium may be integral to the processor.

Various modifications to these examples may be readily apparent to those skilled in the art, and the generic principles defined herein may be applied to other examples without departing from the spirit or scope of the novel aspects described herein. Thus, the scope of the disclosure is not intended to be limited to the examples shown herein but is to be accorded the widest scope consistent with the principles and novel features disclosed herein.

What is claimed is:

1. In an array of electrical devices formed in rows and columns, the array coupled to a plurality of row electrodes and a plurality of column electrodes, a method of determining an electrical characteristic of one or more selected electrical devices, each selected electrical device located in a selected row of the array and in a selected column of the array, the method comprising:
   determining a first value of the electrical characteristic between selected one or more row electrodes and said plurality of column electrodes, said plurality of column electrodes being driven to a common voltage and at least a portion of non-selected row electrodes being configured in a floating state for the first value;
   determining a second value of the electrical characteristic between the selected one or more column electrodes and said plurality of row electrodes, said plurality of row electrodes being driven to a common voltage and at least a portion of non-selected column electrodes being configured in a floating state for the second value;
   determining a third value of an electrical characteristic between the selected one or more row electrodes and the selected one or more column electrodes, the non-selected column and row electrodes being configured in a floating state for the determination of the third value; and
   determining a resulting electrical characteristic or operational state of the one or more selected electrical devices based at least in part on the first and second values, and the third value of the electrical characteristic.

2. The method of claim 1, wherein the array of electrical devices comprises microelectromechanical electrical devices.

3. The method of claim 2, wherein the microelectromechanical devices comprise at least one interferometric modulator.

4. The method of claim 1, wherein the array of electrical devices comprises liquid crystal display (LCD) devices.

5. The method of claim 1, wherein each of the selected one or more electrical devices are each coupled to a selected row electrode and a selected column electrode where they intersect.

6. The method of claim 1, wherein said plurality of row electrodes are driven to a common voltage by commonly connecting the plurality of row electrodes.

7. The method of claim 1, wherein said plurality of column electrodes are driven to a common voltage by commonly connecting the plurality of column electrodes.

8. The method of claim 1, wherein the electrical characteristic comprises capacitance.

9. The method of claim 8, wherein determining capacitance ($C_{selected\_display\_device}$) of the one or more selected electrical devices comprises using the first value ($C_{first\_value}$), the second value ($C_{second\_value}$), and the third value ($C_{third\_value}$) in substantially the following relationship:

$$C_{selected\_display\_device} = \frac{1}{2}\left(C_{second\_value} + C_{third\_value} - \frac{C_{second\_value} C_{third\_value}}{C_{first\_value}}\right).$$

10. The method of claim 1, wherein the electrical characteristic comprises impedance.

11. The method of claim 1, wherein determining an operational state of the one or more selected electrical device comprises comparing the electrical characteristic of said one or more selected electrical devices and a threshold value.

12. A method of determining an operational state of a selected electrical device in a selected row and a selected column of an array, the array comprising a plurality of electrical devices each coupled to a row electrode and a column electrode of a plurality of row electrodes and a plurality of column electrodes of the display, the method comprising:
- determining capacitance between the selected row electrode and a plurality of commonly connected column electrodes;
- determining capacitance between the selected column electrode and a plurality of commonly connected row electrodes;
- determining capacitance between the selected row electrode and the selected column electrode; and
- determining a state of the selected electrical device based at least in part on the determined capacitances.

13. The method of claim 12, wherein the array of electrical devices comprises interferometric modulators.

14. A method of estimating capacitance of one or more selected electrical devices in an array having a plurality of rows of electrical devices and a plurality of columns of electrical devices, the method comprising:
- determining capacitance $C_{row}$ between row electrodes coupled to the selected electrical devices and a plurality of column electrodes coupled to the plurality of columns, the plurality of column electrodes driven to a common voltage;
- determining capacitance $C_{column}$ between column electrodes coupled to the selected electrical devices and a plurality of row electrodes coupled plurality of rows, the plurality of row electrodes driven to a common voltage;
- determining capacitance $C_{effective}$ between the row electrodes and the column electrode coupled to the selected electrical devices; and
- estimating capacitance $C_P$ of the selected electrical devices based at least in part on the determined capacitances $C_{row}$, $C_{column}$, and $C_{effective}$.

15. The method of claim 14, wherein estimating capacitance $C_P$ comprises using the capacitance $C_{row}$, the capacitance $C_{column}$, and the capacitance $C_{effective}$ in substantially the following relationship:

$$C_P = \frac{1}{2}\left(C_{row} + C_{column} - \frac{C_{row}C_{column}}{C_{effective}}\right).$$

16. The method of claim 14, wherein the plurality of row electrodes are driven to a common voltage by commonly connecting the plurality of row electrodes.

17. The method of claim 14, wherein the plurality of column electrodes are driven to a common voltage by commonly connecting the plurality of column electrodes.

18. The method of claim 14, further comprising estimating the operational state of the selected electrical devices by comparing the capacitance of the selected electrical devices and a threshold value.

19. A device for estimating capacitance of one or more selected electrical devices in an array of electrical devices, comprising:
- at least one driving circuit;
- an array of electrical devices, each electrical device being coupled to one of a plurality of first electrodes and one of a plurality of second electrodes;
- measurement circuitry configured to
  - determine capacitance $C_{row}$ between first electrodes coupled to the selected electrical devices and a plurality of second electrodes coupled to the array, the second electrodes driven to a common voltage potential,
  - determine capacitance $C_{column}$ between second electrodes coupled to the selected electrical devices and a plurality of first electrodes coupled to the array, the first electrodes driven to a common voltage potential, and
  - determine capacitance $C_{effective}$ between the first electrodes and the second electrodes coupled to the selected electrical devices; and
- capacitance estimating circuitry configured to estimate capacitance $C_p$ of the selected electrical device based at least in part on the determined capacitances.

20. The device of claim 19, wherein the capacitance estimating circuitry is configured to estimate the capacitance $C_p$ using the capacitance $C_{row}$, the capacitance $C_{column}$, and the capacitance $C_{effective}$ in substantially the following relationship:

$$C_P = \frac{1}{2}\left(C_{row} + C_{column} - \frac{C_{row}C_{column}}{C_{effective}}\right).$$

21. The device of claim 19, further comprising:
- a display;
- a processor that is configured to communicate with the display, the processor being configured to process image data; and
- a memory device that is configured to communicate with the processor.

22. The device of claim 21, further comprising a driver circuit configured to send at least one signal to the display.

23. The device of claim 22, further comprising a controller configured to send at least a portion of the image data to the driver circuit.

24. The device of claim 21, further comprising an image source module configured to send the image data to the processor.

25. The device of claim 24, wherein the image source module comprises at least one of a receiver, transceiver, and transmitter.

26. The device of claim 21, further comprising an input device configured to receive input data and to communicate the input data to the processor.

27. A device for estimating capacitance of one or more selected electrical devices of a plurality of electrical devices, the estimating device comprising:
- means for displaying data on the plurality of electrical devices, wherein the plurality of electrical devices are formed in rows and columns and are coupled to a series of row electrodes and a series of column electrodes;
- means for driving the data displaying means;
- means for determining capacitance $C_{row}$ between one or more row electrodes coupled to one or more selected electrical devices and a plurality of column electrodes coupled to the displaying means and driven to a common voltage potential, determining capacitance $C_{column}$ between one or more column electrodes coupled to the one or more selected electrical devices and a plurality of row electrodes coupled to the displaying means and driven to a common voltage potential, and determining capacitance $C_{effective}$ between the one or more row electrodes and the one or more column electrodes coupled to the one or more selected electrical devices, and providing signals indicative of the determined capacitances; and means for estimating capacitance $C_p$ of the one or more selected electrical devices based at least on signals received from the determining means indicative of the capacitances $C_{row}$, $C_{column}$, and $C_{effective}$.

28. The device of claim 27, wherein said determining means comprises capacitance measuring circuitry, and wherein said estimating means comprises pixel capacitance compiling logic.

29. The device of claim 27, wherein said displaying means comprises a plurality of interferometric modulators.

30. In an array of electrical devices formed in rows and columns and coupled to a plurality of row electrodes and a plurality of column electrodes, a method of determining an electrical characteristic or operational state of a selected electrical device located in a selected row of the array, in a selected column of the array, the method comprising:

providing a predetermined first value of an electrical characteristic corresponding to a first value of the electrical characteristic between a selected row electrode and a selected column electrode, the plurality of column electrodes being driven to a common voltage and at least a portion of non-selected row electrodes floating, the selected electrical device being coupled to the selected row electrode and the selected column electrode;

providing a predetermined second value of an electrical characteristic corresponding to a second value of the electrical characteristic between the selected row electrode and the selected column electrode, the plurality of row electrodes being driven to a common voltage and at least a portion of non-selected column electrodes floating;

determining a third value of an electrical characteristic between selected row electrode and the selected column electrode, the non-selected column electrodes and row electrodes floating; and determining a resulting electrical characteristic or operational state of the selected electrical device based at least in part on the first, second, and third values of the electrical characteristic.

31. The method of claim 30, wherein the electrical characteristic is capacitance, and wherein determining capacitance ($C_{selected\_display\_device}$) of the selected electrical device comprises using the first value ($C_{first\_value}$) the second value ($C_{second\_value}$), and the third value ($C_{third\_value}$) in substantially the following relationship:

$$C_{selected\_display\_device} = \frac{1}{2}\left(C_{second\_value} + C_{third\_value} - \frac{C_{second\_value} C_{third\_value}}{C_{first\_value}}\right).$$

* * * * *